W. M. McCOWN.
Rein-Holder.

No. 205,755. Patented July 9, 1878.

Witnesses
Thomas Nelson Strong
Frederick Robinson Strong

Inventor
William Matthew McCown

UNITED STATES PATENT OFFICE.

WILLIAM M. McCOWN, OF PORTLAND, OREGON.

IMPROVEMENT IN REIN-HOLDERS.

Specification forming part of Letters Patent No. 205,755, dated July 9, 1878; application filed June 3, 1878.

*To all whom it may concern:*

Be it known that I, WILLIAM MATTHEW McCOWN, of the city of Portland, Multnomah county, State of Oregon, have invented a Machine for Holding Driving-Lines, of which the following is a specification:

The object of my invention is to so hold the driving-lines of horses or other animals attached to vehicles as to prevent their running away when left without a driver.

This I accomplish by the combination, in a machine for holding driving-lines, of the rods or guide-bars $b\ b\ b\ b$ with the eccentric-clamp A, the travelers B and C, the endless belt $e$, the pulleys D D, and chain or line $d$, as shown in the accompanying drawings.

Figure 1:
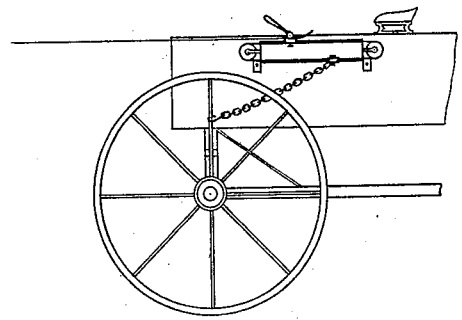
Figure 2:
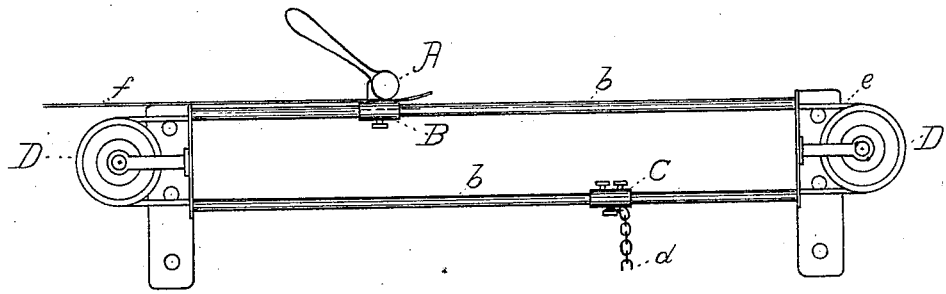
Figure 3:
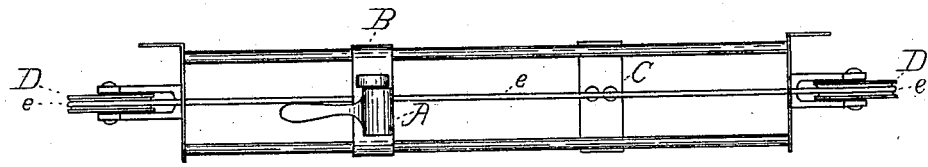
Figure 4:
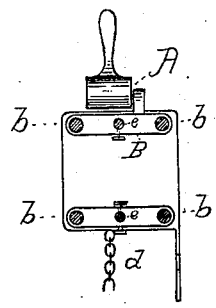

Figure 1 represents one manner of attaching the machine to the wagon or other vehicle with which it is to be used. Fig. 2 is a side section, Fig. 3 a plan view, and Fig. 4 a cross-section, of the machine. Figs. 2, 3, and 4 show the machine in detail.

The eccentric-clamp A is pivoted upon and moves with the traveler B. The traveler B is connected with the traveler C by the endless belt $e$. The belt $e$ passes over the pulleys D D, and is firmly attached to the travelers B and C, both of which move freely backward and forward upon the rods or guide-bars $b\ b\ b\ b$ from one end of the machine to the other. To the traveler C is attached the chain or line $d$.

The manner of its use is evident. The entire machine is fastened firmly to the wagon or other vehicle with which it is to be used, about as represented in Fig. 1, or, as it should more properly appear, directly opposite the wheel to which it is attached. The driving-lines $f$ are then placed under the eccentric-clamp A and fastened down to the traveler B by raising the handle of the clamp A. The chain $d$ is then fastened to one of the fellies or spokes in the wheel of the wagon or other vehicle to which the machine is attached. Any movement of the wagon or other vehicle forward draws the traveler C in the same direction, and this, acting through the endless belt $e$, draws the traveler B and the driving-lines fastened to it backward, and thus stops the animals. Should the wagon or other vehicle go too far back the machine will lock the wheel to which it is attached.

It is evident that the machine may be fastened in different positions and upon different parts of the vehicle to which it is attached, the chain $d$ fastened to any revolving portion of the running-gear, and the eccentric clamp A made to work in any desired position.

I am aware that an eccentric-clamp has been used to fasten driving-lines.

What I claim as my invention is—

The combination, in a machine for holding driving-lines, substantially as described, of the rods or guide-bars $b\ b\ b\ b$ with the eccentric-clamp A, the travelers B and C, the endless belt $e$, the pulleys D D, and chain or line $d$.

WILLIAM MATTHEW McCOWN.

Witnesses:
   THOMAS NELSON STRONG,
   FREDERICK ROBINSON STRONG.